June 23, 1936.  W. C. HEDGCOCK  2,045,299
TRUCK
Filed Nov. 11, 1932  7 Sheets-Sheet 3
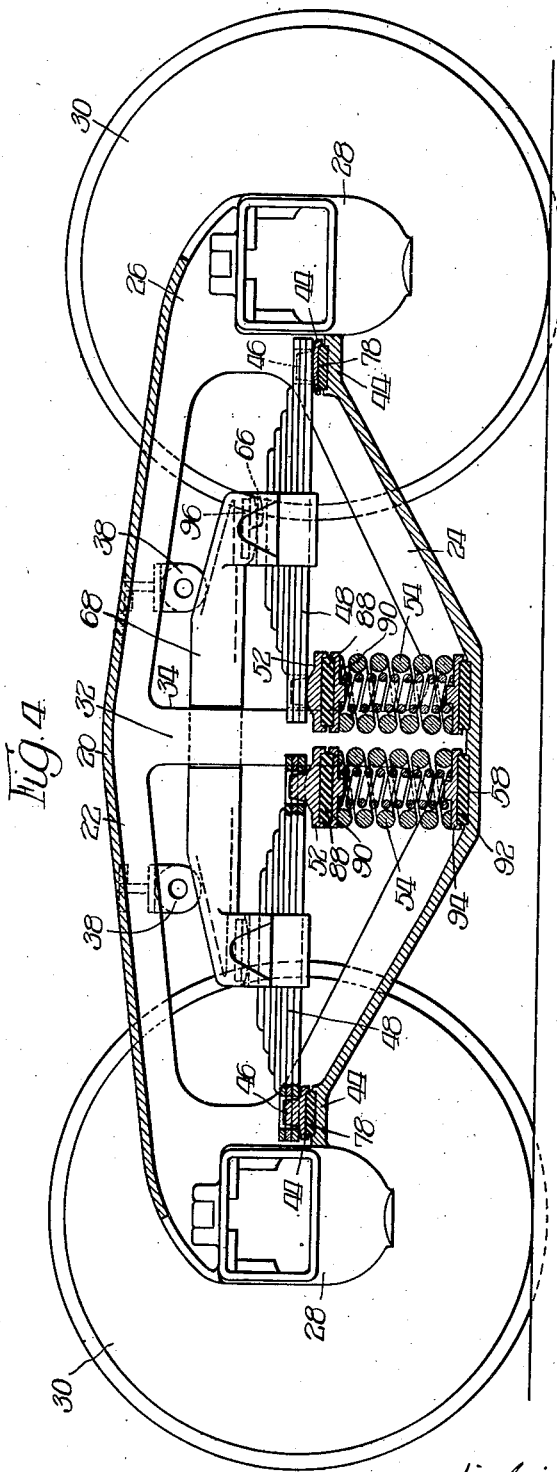
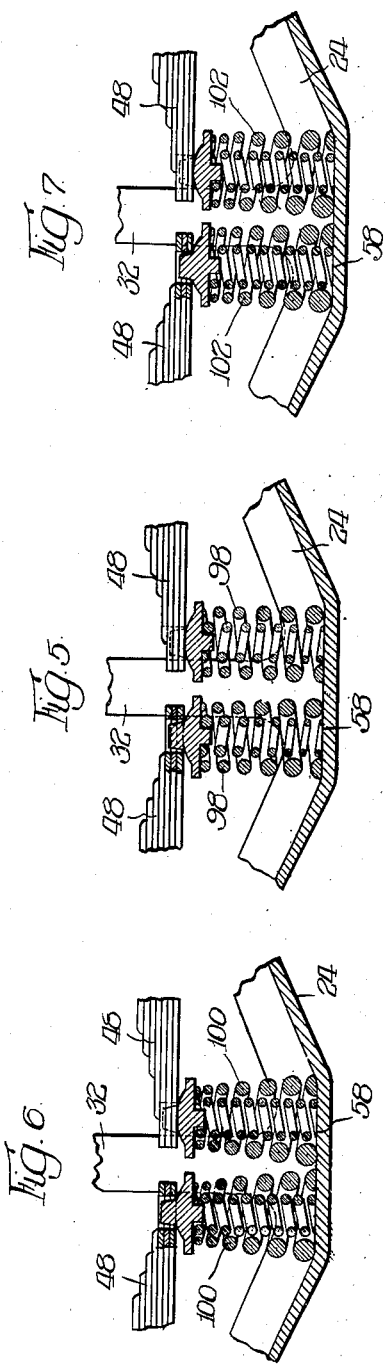
Inventor:
William C. Hedgcock,
By Wilkinson, Huxley, Byron & Knight
Attys.

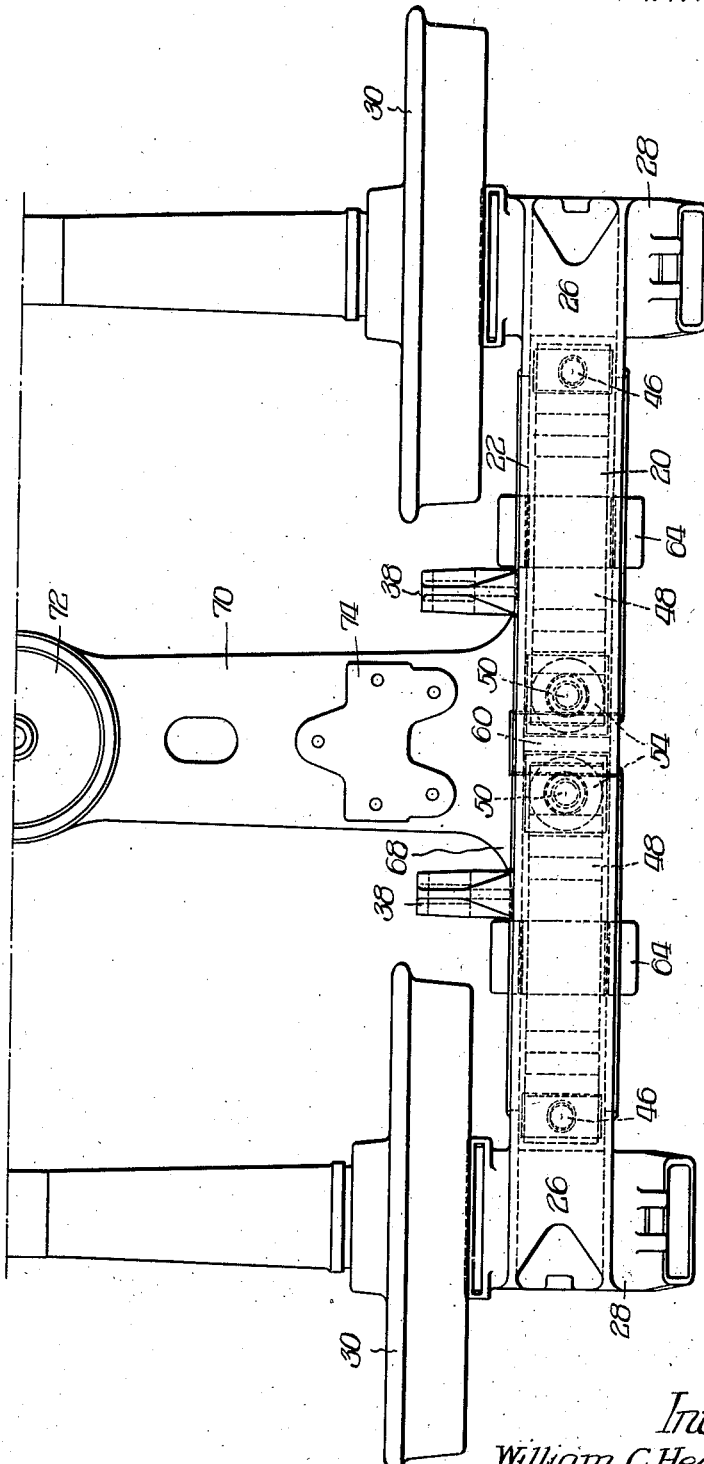

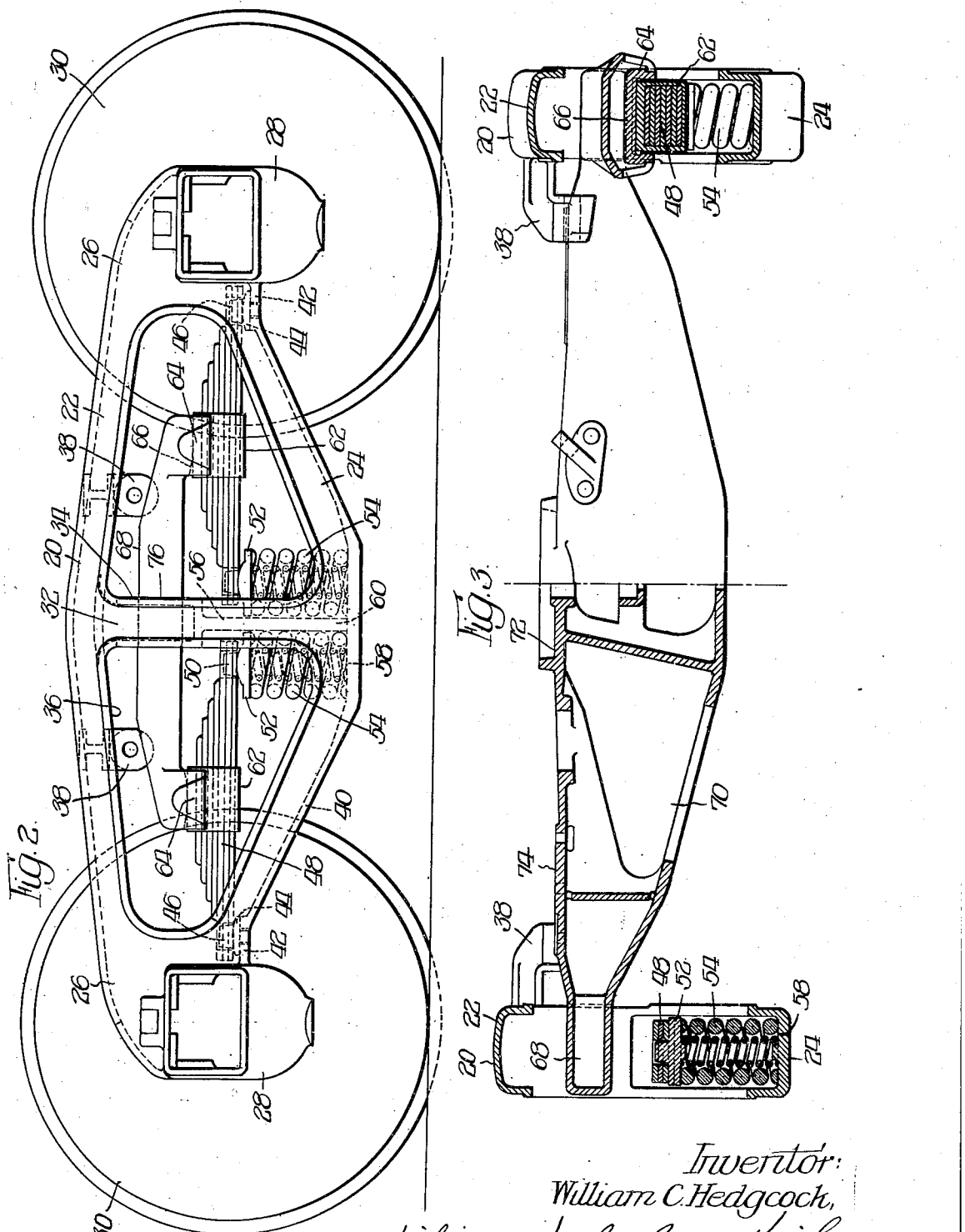

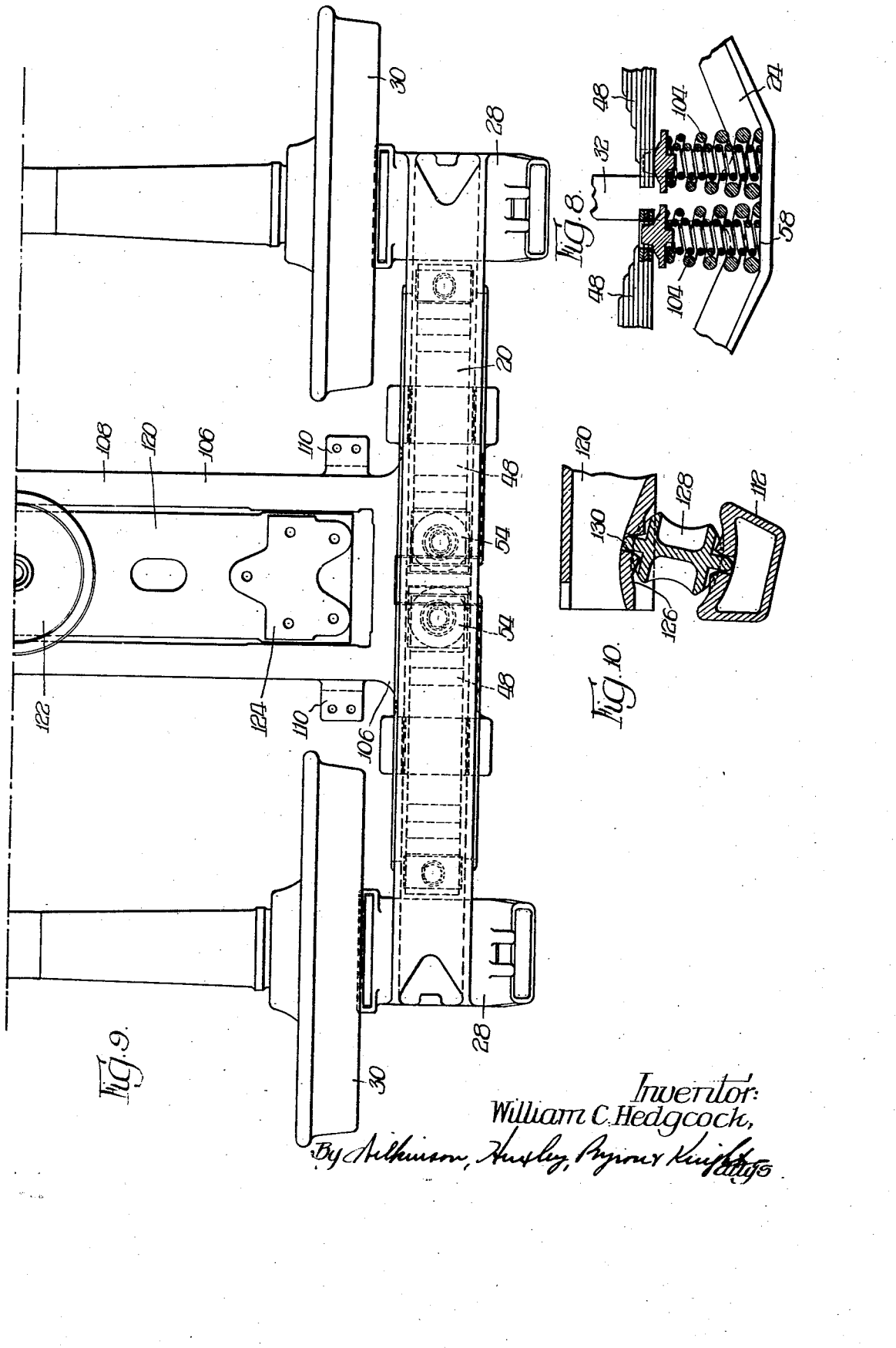

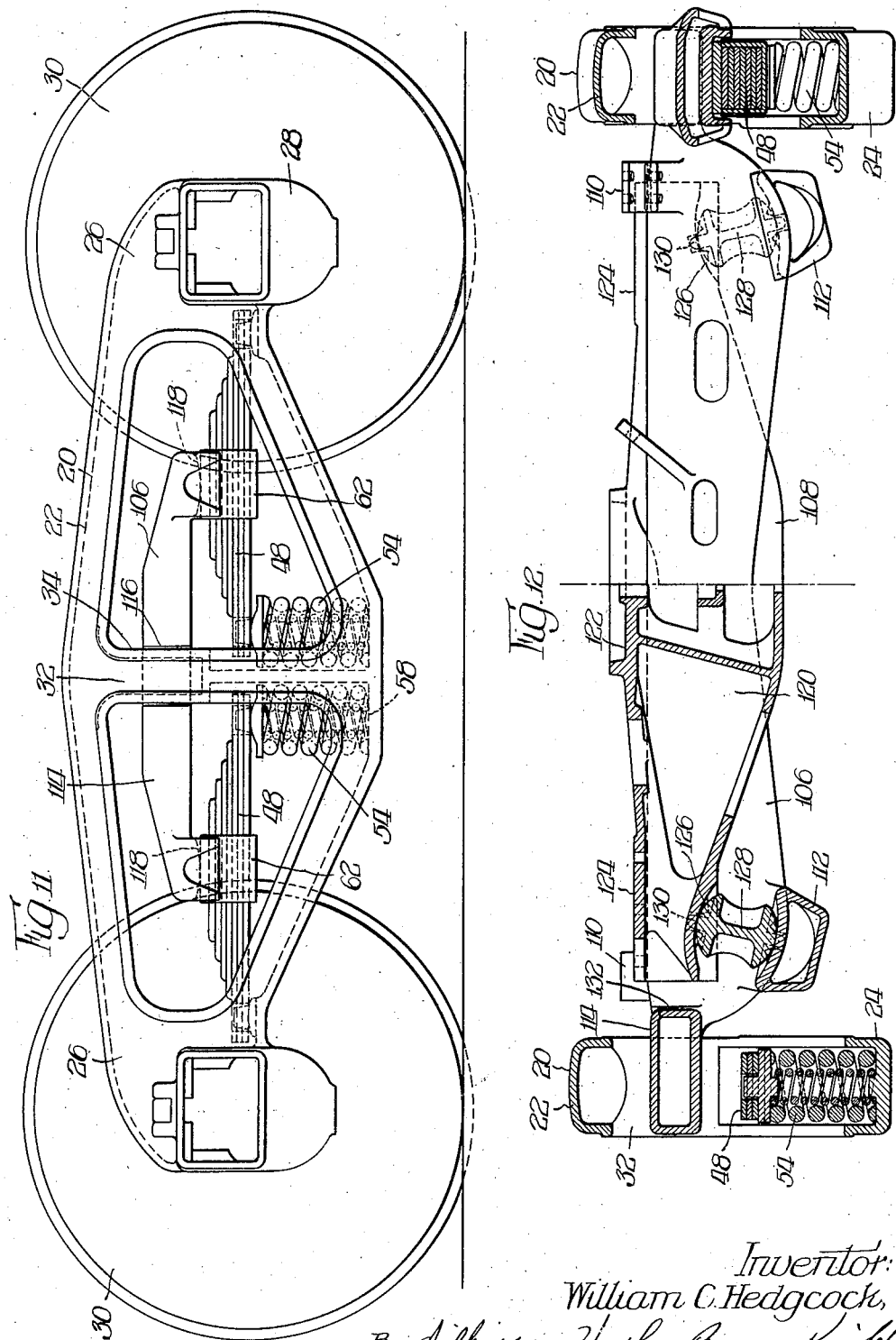

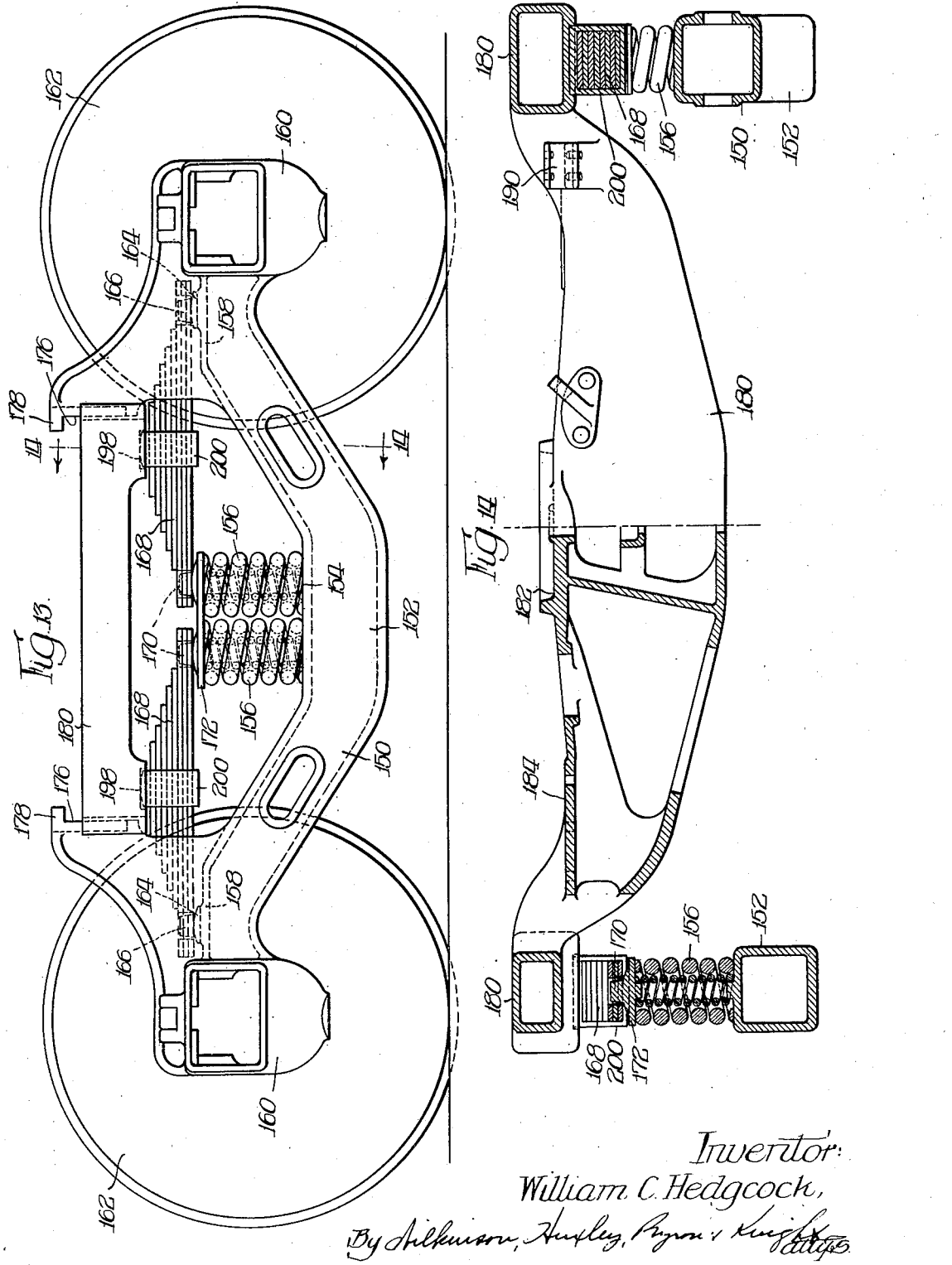

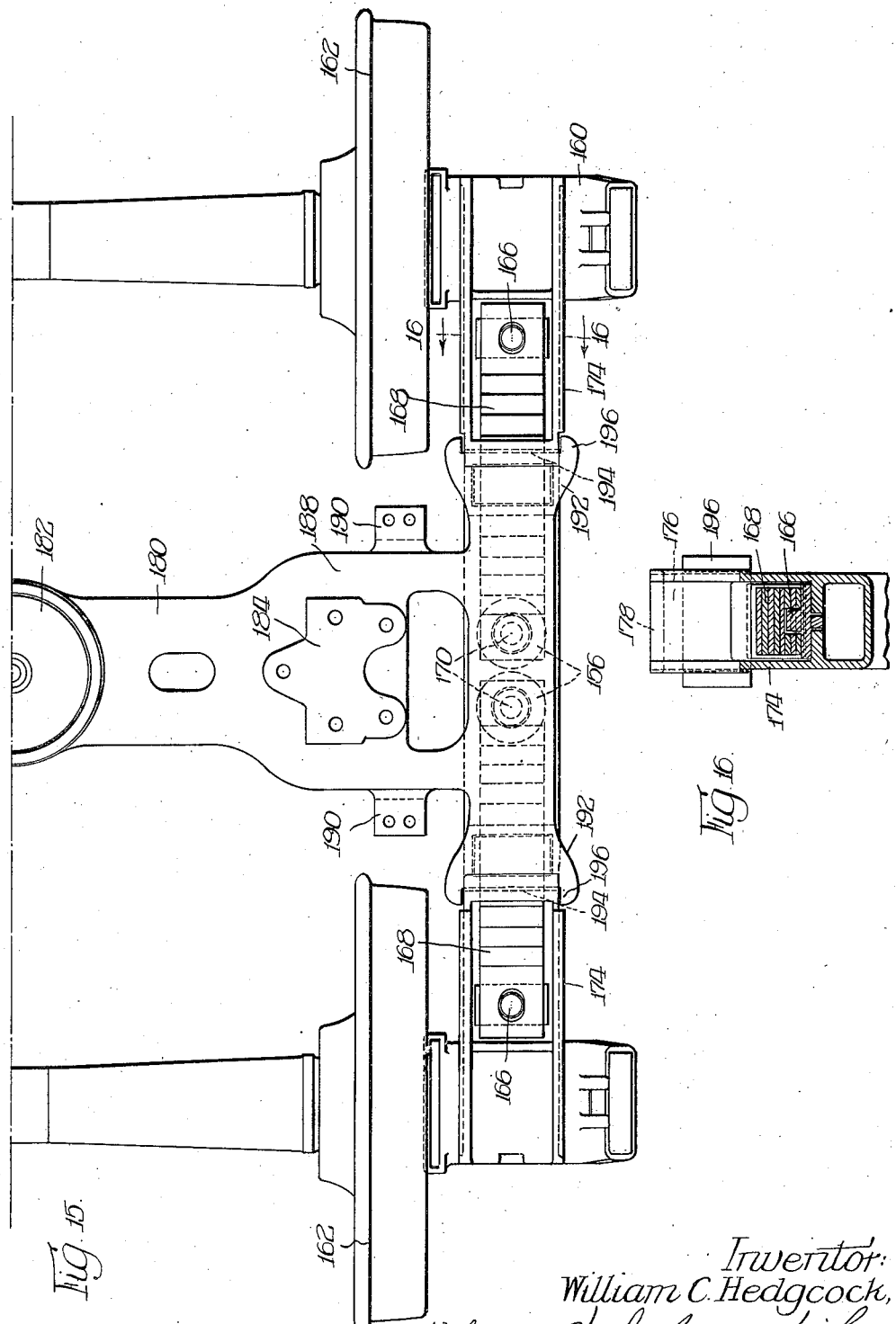

Patented June 23, 1936

2,045,299

UNITED STATES PATENT OFFICE 2,045,299

TRUCK

William C. Hedgcock, Wilmette, Ill., assignor to American Steel Foundries, Chicago, Ill., a corporation of New Jersey Application November 11, 1932, Serial No. 642,144

20 Claims. (Cl. 105—197)

This invention pertains to truck construction, and more particularly to four-wheel trucks adapted particularly for high speed freight car use.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity; that is, in constructions heretofore contemplated a device constructed to provide sufficient friction for rough track conditions would be inadequate and the spring devices used would be too stiff for average or good track conditions.

Passenger car trucks are generally easy riding, due to the use of both coil and elliptic leaf springs in series, the coil springs responding to the light, quick shocks, the leaf springs to the slow, heavy impulses. Coil springs are quick and sensitive to response, leaf springs relatively less so, partly due to frictional work absorption between the leaves. For this reason, and also by providing coil and leaf springs or springs of different characteristics, they tend to dampen each other's vibration without impairing free spring response.

Although the usual passenger car truck with series arrangement of coil and leaf springs gives good riding qualities, it is in general undesirably heavy, costly and complicated for freight service. This is particularly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object is to provide a car truck wherein springs of different character are arranged so that each tends to dampen out the vibrations of the other.

Still another object is to provide spring assemblies wherein there is provided softer cushioning action under light loads, while at the same time providing the necessary stiffness and capacity under heavy loads, these features being combined also to provide a structure which reduces any tendency toward synchronous vibration of the springs.

A different object is to provide a truck construction wherein springs are arranged so that a portion of the load is delivered to the side frame adjacent the journal boxes and a portion at a point spaced therefrom.

Another different object is to provide a truck construction wherein springs are arranged in groups to transmit the load to the side frame at spaced points.

With these and various other objects in view, the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary top plan view of a truck construction embodying the invention;

Figure 2 is a side elevation of the truck construction shown in Figure 1;

Figure 3 is a transverse sectional elevation of the truck construction illustrated in Figures 1 and 2, the section at the left of the figure being taken substantially in the plane of the transverse center line of the truck, and the section at the right of the figure being taken substantially in the plane of the spring band of one of the longitudinally disposed semi-elliptic leaf springs;

Figure 4 is a sectional side elevation taken substantially in the plane of the longitudinal center line of the side frame showing the truck construction illustrated in Figures 1, 2 and 3, with the application of resilient pads between metallic members thereof;

Figures 5 to 8 inclusive, are fragmentary sectional elevations taken substantially in the plane of the longitudinal center line of the side frame showing the application thereto of different types of springs;

Figure 9 is a fragmentary top plan view of a modified form of truck construction embodying the invention;

Figure 10 is an enlarged fragmentary sectional elevation taken substantially in the plane of the longitudinal center line of the bolster, showing the bolster suspended for lateral motion;

Figure 11 is a side elevation of the truck construction shown in Figure 9;

Figure 12 is a transverse sectional elevation of the truck construction illustrated in Figure 9, the section to the left of the figure being taken substantially in the plane of the transverse center line of the truck, and the section to the right of the figure being taken substantially in the plane of the spring band of the longitudinally disposed semi-elliptic springs;

Figure 13 is a side elevation of yet another modified form of truck construction embodying the invention;

Figure 14 is a transverse sectional elevation of the truck construction illustrated in Figure 13, the section to the left of the figure being taken substantially in the plane of the transverse center line of the truck, the section to the right of the figure being taken substantially in the plane as indicated by the line 14—14 of Figure 13;

Figure 15 is a fragmentary top plan view of the construction shown in Figure 13;

Figure 16 is a transverse sectional elevation taken substantially in the plane as indicated by the line 16—16 of Figure 15.

Referring first of all more particularly to the truck construction illustrated in Figures 1 to 4 inclusive, the truck side frame 20 consists essentially of the compression member 22, and the tension member 24 merged adjacent the ends thereof as at 26 and being provided with the journal boxes 28 having cooperative relation with the journal ends of the wheel and axle assemblies 30. The tension and compression members are integrally connected adjacent the centers thereof with a single vertically arranged king post strut or column 32 provided with oppositely disposed guide surfaces 34, the strut 32 forming with the tension and compression members a plurality of adjacent windows 36, suitable brake hanger brackets 38 being provided on the compression member adjacent the wheels of the wheel and axle assemblies. The compression member may be of inverted U-shape and the tension member of U-shape, the lower chord 40 of the tension member being provided with the seat portion 42 adjacent each of the journal boxes 28 for accommodating the leaf spring seat 44.

The seat 44 is provided with the upwardly extending dowel adapted to be received in a suitable aperture in the longitudinally disposed semi-elliptic leaf spring 48 disposed in each of the windows. The other end of the leaf spring is provided with a suitable aperture for receiving the positioning dowel 50 provided on the coil spring seat 52, the coil spring seat 52 being supported on the coil spring 54 extending partially in the spring recess 56 formed in the strut 32 below the guide surfaces 34. The coil spring is seated on the coil spring seat 58 provided on the lower chord 40 of the tension member adjacent the web 60 provided on the strut 32 separating the coil spring recesses 56. It may thus be said that the leaf springs 48 are aligned and disposed in the plane of the side frame and in adjacent windows thereof. Each leaf spring is provided with the central spring band 62 adapted to be received between the jaws 64 of the spaced arcuate spring seats 66 provided on the outer ends 68 of the bolster 70. The bolster 70 is of substantially conventional construction including the center bearing 72 and the side bearings 74, the ends 68 thereof being bifurcated to embrace the central strut 32, having column guide cooperating portions 76 cooperating with the guide surfaces 34 of the central strut.

In the construction illustrated in Figure 4, resilient pads 78 are interposed between the seats 44 and the seat portions 42, said seats and seat portions being suitably recessed for the reception of said pads. Resilient pads 88 are also interposed between the spring cap 52 and the spring cap 90 disposed on top of the coil springs 54, and similar resilient pads 92 are interposed between the spring cap 94 on which the coil springs 54 are seated, and the seat portion 58 of the tension member 24. Similar resilient pads may also be interposed between seat member 66 and the end 68 of the bolster as at 96. In other words, sound-deadening pads may be interposed between adjacent metallic surfaces.

In the constructions illustrated in Figures 1 to 4 inclusive, the coil springs 54 are of constant diameter, constant pitch, and constant section. In the construction illustrated in Figure 5, the coil springs 98 are of the tapered type, that is, formed from a tapered bar, and are shown of constant diameter and constant pitch. In the constuction shown in Figure 6, the tapered coil spring 100 is shown of variable diameter and variable pitch.

In the construction shown in Figure 7, a tapered spring 102 is illustrated of variable pitch and constant diameter, and in the truck construction illustrated in Figure 8, a tapered spring 104 is illustrated of variable diameter and constant pitch.

In the structure illustrated in Figures 9 to 12 inclusive, a construction is used wherein the side frame 20 is provided as already described. However, instead of using the bolster construction directly supported on the leaf springs 48, a transom 106 is provided including the spaced members 108 provided with the brake hanger brackets 110 and connected by means of the inwardly facing roller tracks 112. The spaced members 108 are connected adjacent the ends thereof by means of the end portion 114, said end portion being bifurcated and provided with the column guide cooperating portions 116 disposed in sliding and guiding cooperation with the guide surfaces 34 of the strut 32. The end portion 106 is provided with the spaced arcuate seats 118, similar to the seats 66, said seats being supported on the spring bands 62 of the aligned leaf springs 48.

The lateral motion bolster 120 is of the conventional type provided with the center bearing 122 and the side bearings 124, said bolster being provided with the arcuate roller track 126 between which, and the track 112, the rollers 128 are disposed, suitable tongues 130 thereof being adapted to be received in suitable apertures provided in the track and bolster respectively for positioning said rollers. The rollers slope upwardly and inwardly whereby the bolster is self-centering. The lateral motion of the bolster is limited by means of the stop portion 132 provided on the end portion of the transom.

Referring now more particularly to the truck construction illustrated in Figures 13 to 16 inclusive, the truck side frame 150 is of the beam type, being substantially of box-section and depressed intermediate the ends thereof as at 152 and provided with the spring seats 154 for accommodating the coil spring nests 156. The side frame slopes upwardly and is provided with the seat portion 158 disposed adjacent the journal boxes 160, the journal boxes being adapted to have cooperative relation with the journal ends of the wheel and axle assemblies 162. The seat portion 158 of the side frame is provided with the leaf spring seat 164 provided with the upwardly extending positioning dowel 166 adapted to be received in a suitable aperture in the semi-elliptic leaf spring assembly 168. The leaf spring assemblies in this construction are disposed in alignment with each other and longitudinally of the truck, the inner ends being provided with a suitable aperture for receiving the positioning dowel 170 of the common spring cap 172 positioned on the adjacent coil spring nests 156.

The side frame adjacent the journal boxes is provided with the wings including the spaced brackets 174 disposed on each side of the leaf spring seats 164 and connected by means of the columns or guide surfaces 176 provided adjacent the upper ends thereof with the limiting lugs 178 for limiting the upward movement of the bolster 180. The bolster 180 intermediate the ends thereof is substantially of conventional construction, being provided with the center bearing 182 and the side bearings 184, the bolster widening out adjacent the ends thereof as at 188 and being provided with the brake hanger brackets 190. The bolster is further provided with the bolster wing 192 and column guide cooperating portions 194 defined by the lugs 196. The bolster wings are provided adjacent the columns with the seat 198 adapted to receive the arcuate seat engaging portion of the spring bands 200 of the leaf springs 168.

In the truck constructions illustrated, the combination of semi-elliptic and coil springs is provided, said springs being disposed in series, giving the advantage of a truck construction having easy riding qualities. The easy riding qualities are increased due to the fact that the side frame members may be of very light construction because of the disposition of the springs, while guiding the load carrying member by the side frame. The side frame is of very simple construction and, in Figures 1 to 12 inclusive, provides a single king post truss arrangement instead of the usual truss side frame having two columns. The leaf springs distribute the loads so that substantially half of the vertical loads are delivered to the side frame adjacent the journal boxes, leaving only half the vertical load to be carried at the center of the truss construction. This of course permits a very light side frame construction with ample strength to carry the loads, in comparison with the ordinary truck wherein all the load is carried adjacent the center of the side frame.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is—

1. In a car truck, the combination of a side frame including a tension and a compression member merging adjacent the ends thereof and having journal boxes, a central column integrally connecting said tension and compression members forming windows therewith and having guiding surfaces, said column being recessed on each side thereof, spring seats in said recesses and adjacent said journal boxes, a coil spring disposed on one of said seats in each of said windows, a leaf spring having one end seated on the other of said seats in each of said windows and the other end thereof supported by the coil spring in its respective window, and a load carrying member extending into each of said windows and supported on said leaf springs, said load carrying member having sliding cooperation with said guiding surfaces and comprising a transom and a bolster movably supported on said transom.

2. In a car truck, the combination of a side frame including a tension and compression member connected together adjacent the ends thereof and being provided with journal boxes adjacent said ends, a central column integrally connecting said tension and compression members and forming windows therewith and having guiding surfaces, said column being recessed on each side thereof, spring seats in said recesses and adjacent said journal boxes, a coil spring of variable stiffness disposed on one of said seats in each of said windows, a leaf spring having one end seated on the other of said seats in each of said windows and the other end thereof supported by the coil spring in its respective window, and a load carrying member extending into each of said windows and supported on said leaf springs, said load carrying member having sliding cooperation with said guiding surfaces.

3. In a car truck, the combination of a side frame including a tension and compression member connected together adjacent the ends thereof and being provided with journal boxes adjacent said ends, a central column integrally connecting said tension and compression members and forming windows therewith and having guiding surfaces, said column being recessed on each side thereof, spring seats in said recesses and adjacent said journal boxes, a coil spring of tapered section disposed on one of said seats in each of said windows, a leaf spring having one end seated on the other of said seats in each of said windows and the other end thereof supported by the coil spring in its respective window, and a load carrying member extending into each of said windows and supported on said leaf springs, said load carrying member having sliding cooperation with said guiding surfaces.

4. In a car truck, the combination of a side frame including a tension and a compression member connected together adjacent the ends thereof and being provided with journal boxes adjacent said ends, a central column integrally connecting said tension and compression members and forming windows therewith and having guiding surfaces, said column being recessed on each side thereof, spring seats in said recesses and adjacent said journal boxes, a coil spring of variable diameter disposed on one of said seats in each of said windows, a leaf spring having one end seated on the other of said seats in each of said windows and the other end thereof supported by the coil spring in its respective window, and a load carrying member extending into each of said windows and supported on said leaf springs, said load carrying member having sliding cooperation with said guiding surfaces.

5. In a car truck, the combination of a side frame including a tension and a compression member connected together adjacent the ends thereof and being provided with journal boxes adjacent said ends, a central column integrally connecting said tension and compression members and forming windows therewith and having guiding surfaces, said column being recessed on each side thereof, spring seats in said recesses and adjacent said journal boxes, a coil spring of variable diameter and constant pitch disposed on one of said seats in each of said windows, a leaf spring having one end seated on the other of said seats in each of said windows and the other end thereof supported by the coil spring in its respective window, and a load carrying member extending into each of said windows and supported on said leaf springs, said load carrying member having sliding cooperation with said guiding surfaces.

6. In a car truck, the combination of a side frame including a tension and compression member connected together adjacent the ends thereof and being provided with journal boxes adjacent said ends, a central column integrally connecting said tension and compression members and forming windows therewith and having guiding surfaces, said column being recessed on each side thereof, spring seats in said recesses and adjacent said journal boxes, a coil spring of variable diameter and pitch disposed on one of said seats in each of said windows, a leaf spring having one end seated on the other of said seats in each of said windows and the other end thereof supported by the coil spring in its respective window, and a load carrying member extending into each of said windows and supported on said leaf spring, said load carrying member having sliding cooperation with said guiding surfaces.

7. In a car truck, the combination of a side frame including a tension and compression member connected together adjacent the ends thereof and being provided with journal boxes adjacent said ends, a central column integrally connecting said tension and compression members and forming windows therewith and having guiding surfaces, said column being recessed on each side thereof, spring seats in said recesses and adjacent said journal boxes, a coil spring of constant section, diameter and pitch disposed on one of said seats in each of said windows, a leaf spring having one end seated on the other of said seats in each of said windows and the other end thereof supported by the coil spring in its respective window, and a load carrying member extending into each of said windows and supported on said leaf springs, said load carrying member having sliding cooperation with said guiding surfaces.

8. In a truck, the combination of a side frame, a load carrying member, resilient means supporting said load carrying member on said side frame, said resilient means including semi-elliptic leaf springs longitudinally disposed with respect to said side frame and supporting said load carrying member intermediate the ends thereof, the outer of the ends of said leaf springs being non-resiliently mounted on said side frame, and the other ends of said leaf springs being resiliently mounted on said side frame.

9. In a truck, the combination of a side frame, a load carrying member, resilient means supporting said load carrying member on said side frame, said resilient means including semi-elliptic leaf springs longitudinally disposed with respect to said side frame and supporting said load carrying member intermediate the ends thereof, the outer of the ends of said leaf springs being non-resiliently mounted on said side frame, and the other ends of said leaf springs being resiliently mounted on said side frame through a coil spring.

10. In a truck, the combination of a side frame comprising a single beam member having journal boxes at the ends thereof, columns adjacent said journal boxes, a load carrying member provided with portions having sliding cooperation with said columns, and a plurality of leaf springs for supporting said load carrying member on said side frame, each of said leaf springs being non-resiliently supported at one point on said side frame and resiliently supported at another point on said side frame.

11. In a truck, the combination of a side frame comprising a single beam member having journal boxes at the ends thereof, columns adjacent said journal boxes, a load carrying member provided with portions having sliding cooperation with said columns, and a plurality of leaf springs for supporting said load carrying member on said side frame, each of said leaf springs being non-resiliently supported at one point on said side frame and resiliently supported at another point on said side frame through a coil spring.

12. In a truck, the combination of a side frame comprising a single beam member having journal boxes at the ends thereof, columns adjacent said journal boxes, a load carrying member provided with portions having sliding cooperation with said columns, and a plurality of leaf springs for supporting said load carrying member on said side frame intermediate the ends thereof, each of said leaf springs having an end non-resiliently mounted on said side frame adjacent a journal box and another end resiliently supported adjacent the central portion of said side frame.

13. In a truck, the combination of a side frame comprising a single beam member having journal boxes at the ends thereof, columns adjacent said journal boxes, a load carrying member provided with portions having sliding cooperation with said columns, and a plurality of leaf springs for supporting said load carrying member on said side frame intermediate the ends thereof, each of said leaf springs having an end non-resiliently mounted on said side frame adjacent a journal box and another end resiliently supported adjacent the central portion of said side frame through a coil spring.

14. In a truck, the combination of a side frame having journal boxes adjacent the ends thereof, a load carrying member, resilient means supporting said load carrying member on said side frame, said resilient means including aligned leaf springs each being non-resiliently supported adjacent a journal box and resiliently supported adjacent the central portion of said frame.

15. In a truck, the combination of a side frame having journal boxes adjacent the ends thereof, a load carrying member, resilient means supporting said load carrying member on said side frame, said resilient means including aligned leaf springs each being non-resiliently supported adjacent a journal box and resiliently supported adjacent the central portion of said frame through a coil spring.

16. In a truck, the combination of a side frame having journal boxes adjacent the ends thereof, a load carrying member, resilient means supporting said load carrying member on said side frame, said resilient means including aligned leaf springs supporting said load carrying member intermediate the ends thereof, each of said leaf springs being non-resiliently supported at one end adjacent a journal box and resiliently supported at the other end adjacent the central portion of said frame.

17. In a truck, the combination of a side frame having journal boxes adjacent the ends thereof, a load carrying member, resilient means supporting said load carrying member on said side frame, said resilient means including aligned leaf springs supporting said load carrying member intermediate the ends thereof, each of said leaf springs being non-resiliently supported at one end adjacent a journal box and resiliently supported at the other end adjacent the central portion of said frame through a coil spring formed from a tapered bar and having a constant diameter and pitch.

18. In a truck, the combination of a side frame having journal boxes adjacent the ends thereof, a load carrying member, resilient means supporting said load carrying member on said side frame, said resilient means including aligned leaf springs supporting said load carrying member intermediate the ends thereof, each of said leaf springs being non-resiliently supported at one end adjacent a journal box and resiliently supported at the other end adjacent the central portion of said frame through a coil spring formed from a tapered bar and having a constant diameter and variable pitch.

19. In a truck, the combination of a side frame having journal boxes adjacent the ends thereof, a load carrying member, resilient means supporting said load carrying member on said side frame, said resilient means including aligned leaf springs supporting said load carrying member intermediate the ends thereof, each of said leaf springs being non-resiliently supported at one end adjacent a journal box and resiliently supported at the other end adjacent the central portion of said frame through a coil spring formed from a tapered bar and having a variable diameter and pitch.

20. In a truck, the combination of a side frame having journal boxes adjacent the ends thereof, a load carrying member, resilient means supporting said load carrying member on said side frame, said resilient means including aligned leaf springs supporting said load carrying member intermediate the ends thereof, each of said leaf springs being non-resiliently supported at one end adjacent a journal box and resiliently supported at the other end adjacent the central portion of said frame through a coil spring formed from a tapered bar and having a constant pitch and variable diameter.

WILLIAM C. HEDGCOCK.